(12) United States Patent
Masuda et al.

(10) Patent No.: US 10,427,260 B2
(45) Date of Patent: Oct. 1, 2019

(54) MACHINE TOOL

(71) Applicant: STAR MICRONICS CO., LTD., Shizuoka-shi (JP)

(72) Inventors: Koji Masuda, Shizuoka (JP); Takayuki Ishikawa, Shizuoka (JP); Motohiro Kawamura, Shizuoka (JP)

(73) Assignee: STAR MICRONICS CO., LTD., Shizuoka-Shi (JP)

( * ) Notice: Subject to any disclaimer, the term of this patent is extended or adjusted under 35 U.S.C. 154(b) by 26 days.

(21) Appl. No.: 15/867,611

(22) Filed: Jan. 10, 2018

(65) Prior Publication Data

US 2018/0264609 A1    Sep. 20, 2018

(51) Int. Cl.
*B32B 13/12*      (2006.01)
*B23Q 7/00*       (2006.01)
*B23B 13/12*      (2006.01)

(52) U.S. Cl.
CPC ............ *B23Q 7/006* (2013.01); *B23B 13/128* (2013.01)

(58) Field of Classification Search
CPC ..... B23B 13/128; B23B 13/123; B23B 13/12; B23B 7/10; B23Q 7/006; Y10T 82/2514
USPC .............................................. 406/76; 414/15
See application file for complete search history.

(56) References Cited

U.S. PATENT DOCUMENTS

| | | | | |
|---|---|---|---|---|
| 2,906,003 A | * | 9/1959 | Lakins | ........... B23B 13/00 414/15 |
| 3,066,806 A | * | 12/1962 | Lakins | ........... B23B 13/128 294/106 |
| 3,924,494 A | * | 12/1975 | Azuma | ........... B23B 13/02 414/15 |
| 4,958,543 A | * | 9/1990 | Newton | ........... B23Q 7/001 414/17 |
| 5,531,398 A | * | 7/1996 | Krska | ........... B65H 19/30 242/533.7 |

FOREIGN PATENT DOCUMENTS

| | | | | | |
|---|---|---|---|---|---|
| CH | | 446005 A | * | 10/1967 | ........... B32B 7/10 |
| CH | | 572779 A5 | * | 2/1976 | ........... B32B 13/128 |
| DE | | 2127975 A1 | * | 2/1973 | ........... B32B 13/128 |
| DE | | 102007013980 | | 11/2008 | |

(Continued)

OTHER PUBLICATIONS

Description CH446005 (translation) obtained at https://worldwide.espacenet.com/ (last visited Apr. 3, 2019).*

(Continued)

*Primary Examiner* — Ryan C Rufo
(74) *Attorney, Agent, or Firm* — Lex IP Meister, PLLC (57) ABSTRACT

The invention provides a machine tool capable of facilitating a process of switching product ejecting apparatuses. The machine tool comprises a spindle which rotates a workpiece around an axis of the spindle, an actuator which reciprocates a rod arranged parallel to the axis of the spindle, and a coupler switched between a coupling position and a standby position. The coupler connects the rod and an ejecting shaft inserted in the spindle when held in the coupling position. The coupler is not connected to at least the ejecting shaft when held in the standby position. The ejecting shaft along with the coupler is moved in the direction of the axis of the spindle according to reciprocation of the rod when the coupler is held in the coupling position.

8 Claims, 10 Drawing Sheets

(56) References Cited

FOREIGN PATENT DOCUMENTS

| EP | 0525554 A2 | * | 2/1993 | ............ B32B 13/123 |
|---|---|---|---|---|
| EP | 1291127 A1 | * | 3/2003 | ............. B23B 13/02 |
| GB | 1140494 A | * | 1/1969 | ............ B32B 13/128 |
| JP | 2009-101496 | | 5/2009 | |

OTHER PUBLICATIONS

Description JP2009101496 (translation) obtained at https://worldwide.espacenet.com/ (last visited Apr. 4, 2019).*
EPO, Extended European Search Report of Application No. 18153862.0, dated Jul. 20, 2018.

* cited by examiner

MACHINE TOOL

CROSS-REFERENCE TO RELATED APPLICATION

This application claims priority of Japanese Patent Application No. 2017-047989 filed on Mar. 14, 2017. The contents of this application are incorporated herein by reference in their entirety.

BACKGROUND OF THE INVENTION

The invention relates to a machine tool provided with a product ejecting apparatus.

It is known that a front face of a workpiece is machined by a headstock and a tool post and then a back face of the workpiece is machined by a backworking unit. The backworking unit is provided with a product ejecting apparatus which ejects a finished workpiece or a product. In a known ejecting apparatus using an air cylinder, a product ejecting shaft inserted in a sub spindle is advanced by the air cylinder to eject a product toward an advancing direction. In another known ejecting apparatus using a pipe, a product passes through the pipe inserted in the sub spindle to be ejected toward a retracting direction. In a lathe disclosed in Japanese patent application publication No. 2009-101496, a product ejector inserted in the sub spindle is reciprocated by a linear motion actuator.

SUMMARY

Preferably, the air cylinder ejecting apparatus and the pipe ejecting apparatus are easily switchable. Japanese patent application publication No. 2009-101496 only discloses the product ejecting apparatus using the linear motion actuator. There is no disclosure of switching product ejecting apparatuses. The problem is not limited to a lathe provided with a backworking unit, but applied to various kinds of machine tools.

The present invention discloses a machine tool capable of facilitating a process of switching product ejecting apparatuses.

A machine tool of the invention comprises a spindle which rotates a workpiece around an axis of the spindle, an actuator which reciprocates a rod arranged parallel to the axis of the spindle, and a coupler switched between a coupling position and a standby position. The coupler connects the rod and an ejecting shaft inserted in the spindle when held in the coupling position. The coupler is not connected to at least the ejecting shaft when held in the standby position. The ejecting shaft along with the coupler is moved in the direction of the axis of the spindle according to reciprocation of the rod when the coupler is held in the coupling position.

The present invention provides a machine tool capable of facilitating a process of switching product ejecting apparatuses.

DETAILED DESCRIPTION

Hereinafter, an embodiment of the present invention will be described. The invention is not limited to the exemplary embodiment and the features disclosed herein are necessarily not essential to the invention.

(1) Summary of Technology Included in the Present Invention

Technology included in the invention will be described with reference to FIG. 1 to FIG. 10. The drawings only schematically show an example of the invention. They may have a mismatch to each other due to different magnification in each direction. Each element denoted by a symbol is only an example.

Embodiment 1

A machine tool 1 of an embodiment comprises a spindle (a sub spindle 52, for example) which rotates a workpiece W1 around a spindle axis AX1, an actuator 110 which reciprocates a rod 112 arranged parallel to the spindle axis AX1, and an coupler 200 switched between a coupling position P1 and a standby position P2. When the coupler 200 is held in the coupling position P1, a product ejecting shaft 72 inserted in the sub spindle 52 is coupled to the rod 112. When the coupler is held in the standby position P2, the coupler 200 is not connected to at least the ejecting shaft 72. When the ejecting shaft 72 and the rod 112 are coupled by the coupler 200 in the coupling position P1, the ejecting shaft 72 along with the coupler 200 is moved in the direction of the spindle axis (the Z-axis direction) according to reciprocation of the rod 112.

When the actuator 110 is used as a product ejecting apparatus, the ejecting shaft 72 is driven in the direction of the spindle axis (the Z-axis direction) by the actuator 110 by holding the coupler 200 in the coupling position P1. When the actuator 110 is not used, another product ejecting apparatus such as a pipe ejecting apparatus is available by holding the coupler 200 in the standby position P2. There is no need of removing the coupler 200 when the ejecting shaft 72 is not used. Accordingly, the embodiment provides a machine tool capable of facilitating a process of switching product ejecting apparatuses.

The spindle is not limited to the sub spindle and may be a main spindle. The workpiece comprises a product.

Embodiment 2

The machine tool 1 may be provided with a guide shaft G0 arranged parallel to the spindle axis AX1 and the rod 112.

Figure 5:
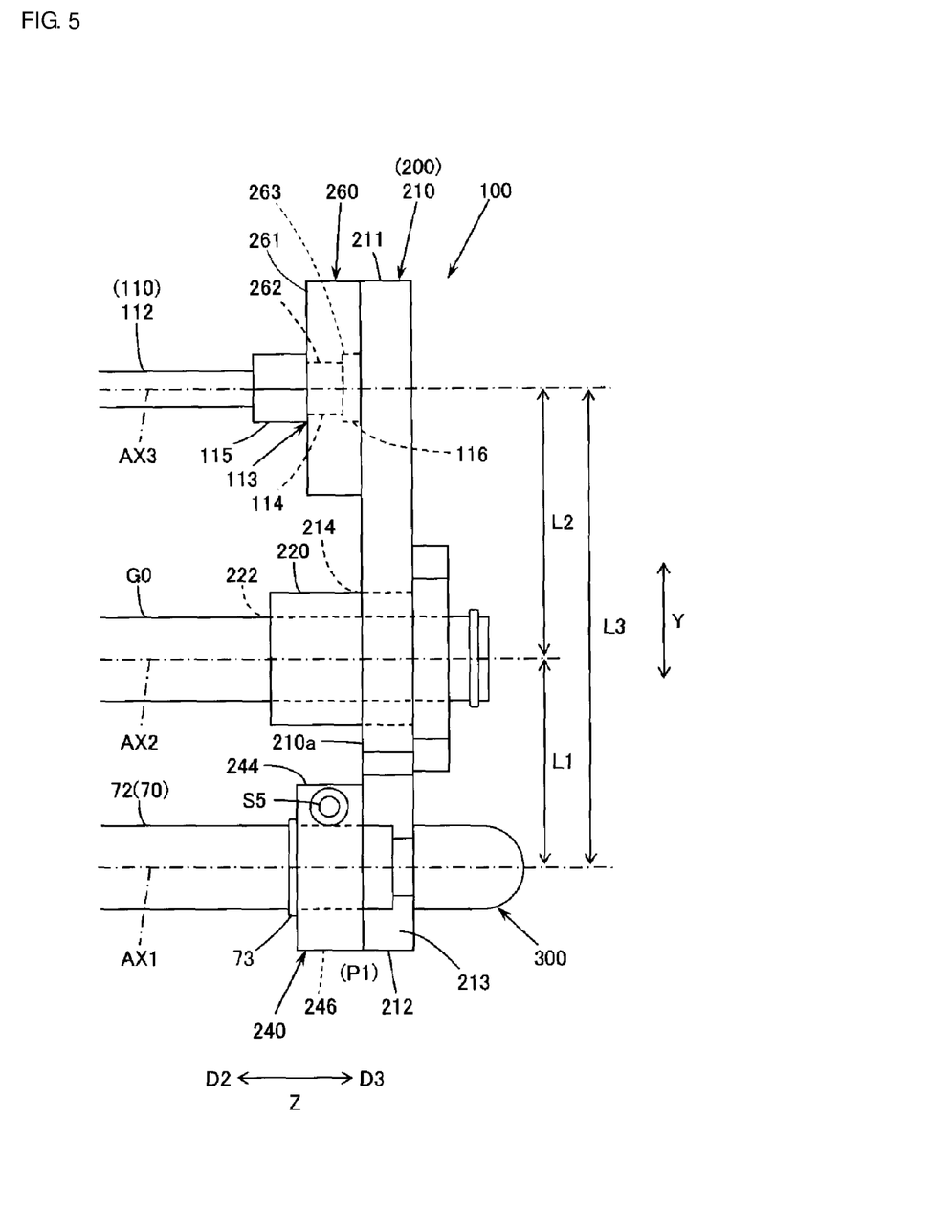
FIG. 5 shows part of the backworking unit where the product ejecting shaft is coupled to a rod of an actuator.

As shown in FIG. 5, a distance L1 between the spindle axis AX1 and a guide shaft axis AX2 of the guide shaft G0 may be shorter than a distance L3 between the spindle axis AX1 and a rod axis AX3 of the rod 112. A distance L2 between the guide shaft axis AX2 and the rod axis AX3 may be shorter than the distance L3 between the spindle axis AX1 and the rod axis AX3. The coupler 200 may have a through-hole 222 for the guide shaft G0. The coupler 200 may be movable in the spindle axis direction (the Z-axis direction) along the guide shaft G0. The coupler 200 may be rotatable around the guide shaft G0 to be switched between the coupling position P1 and the standby position P2. The embodiment reduces torsion force applied to the rod 112 and the ejecting shaft 72 so that the rod 112 may be smoothly reciprocated to move the ejection shaft in the direction of the spindle axis. The invention may be applied to a machine tool not provided with a guide shaft.

Embodiment 3

The coupler 200 may be provided with an engaging portion (an engaging piece 260, for example) having a groove 262 for receiving the rod 112 when the coupler 200 is moved from the standby position P2 to the coupling position P1. The rod 112 may be provided with an insert 114 to be received in the groove 262. The rod 112 may be further provided with an engagement structure 113 to prevent the rod 112 from relatively moving in the advancing and retracting directions when the insert 114 is received in the groove 262. The coupler 200 is engaged with the rod 112 only by moving the coupler 200 from the standby position P2 to the coupling position P1. The embodiment provides a machine tool capable of facilitating a process of switching product ejecting apparatuses without using a screw. The invention may be applied to a machine tool in which the rod is not provided with the engagement structure and the coupler is connected to the rod by a screw.

(2) Example of Machine Tool Configuration

Figure 1:
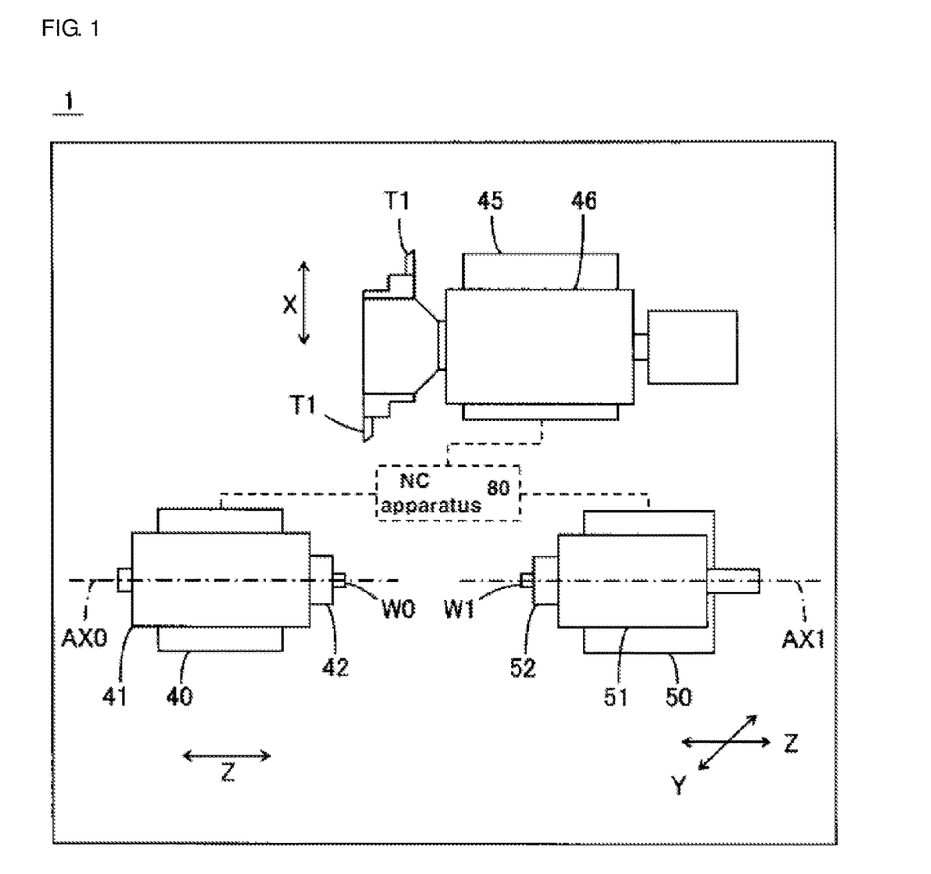
FIG. 1 schematically shows an example of configuration of a machine tool.

FIG. 1 schematically shows an example of configuration of the machine tool. The machine tool 1 comprises an NC apparatus 80, a headstock 41 mounted on a stationary base 40, a backworking unit 51 mounted on a stationary base 50, and a tool post 46 mounted on a stationary base 45. The NC apparatus 80 controls the headstock 41, the backworking unit 51, and the tool post 46.

The headstock 41 is movable in the Z-axis direction along a main spindle axis AX0. The NC apparatus 80 controls the Z-axis position of the headstock 41 via a not-shown driving unit thereof. The headstock 41 is provided with a main spindle 42. The main spindle 42 releasably chucks a cylindrical or bar workpiece W0 by a not-shown collet to rotate the workpiece W0 on the main spindle axis AX0 along the longitudinal direction of the workpiece W0. The Z-axis direction may be the horizontal direction in the embodiment but not limited thereto.

The backworking unit 51 is movable in the Z-axis direction along the spindle axis AX1 and in a Y-axis direction perpendicular to the Z-axis direction. The NC apparatus 80 controls the Z-axis position and the Y-axis position of the backworking unit 51 via a not-shown driving unit thereof. The backworking unit 51 is provided with the sub spindle 52. The sub spindle 52 releasably chucks the workpiece W1 whose front face has been machined. The workpiece W1 is rotated by the sub spindle 52 on the spindle axis AX1. The sub spindle 52 is called an opposite spindle since it is opposite the main spindle 42. The Y-axis direction may be the horizontal direction in the embodiment but not limited thereto.

The tool post 46 has a plurality of tools T1 for machining the workpiece W0, W1 attached thereto. The tool post 46 is movable in an X-axis direction perpendicular to the Z-axis direction and the Y-axis direction. The NC apparatus 80 controls the X-axis position of the tool post 46 via a not-shown driving unit thereof. The X-axis direction may be the vertical direction in the embodiment but not limited thereto. The tool post may be a turret tool post or a gang tool post. Various types of tool posts are available. The moving direction of the headstock 41, the backworking unit 51, and the tool post 46 is not limited to the direction as shown in FIG. 1.

Figure 2:
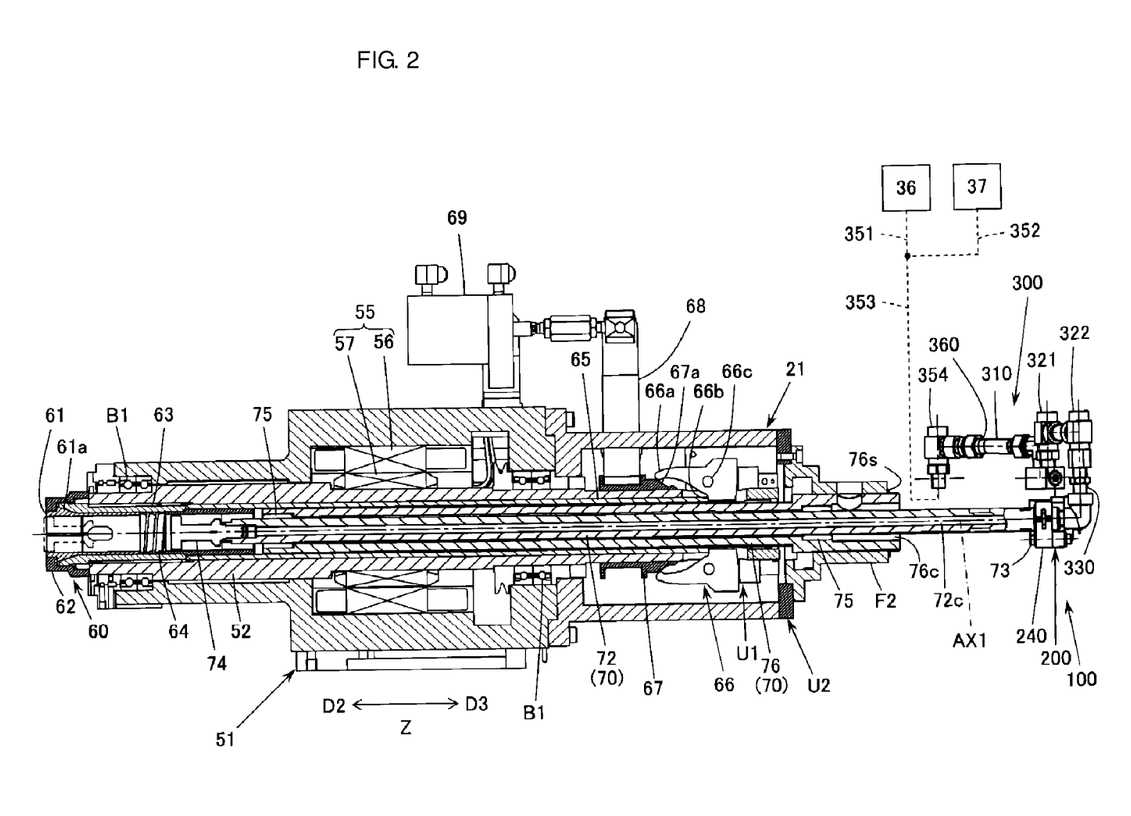
FIG. 2 is a longitudinal section view of a backworking unit where a product ejecting shaft is inserted in a sub spindle.
Figure 3:
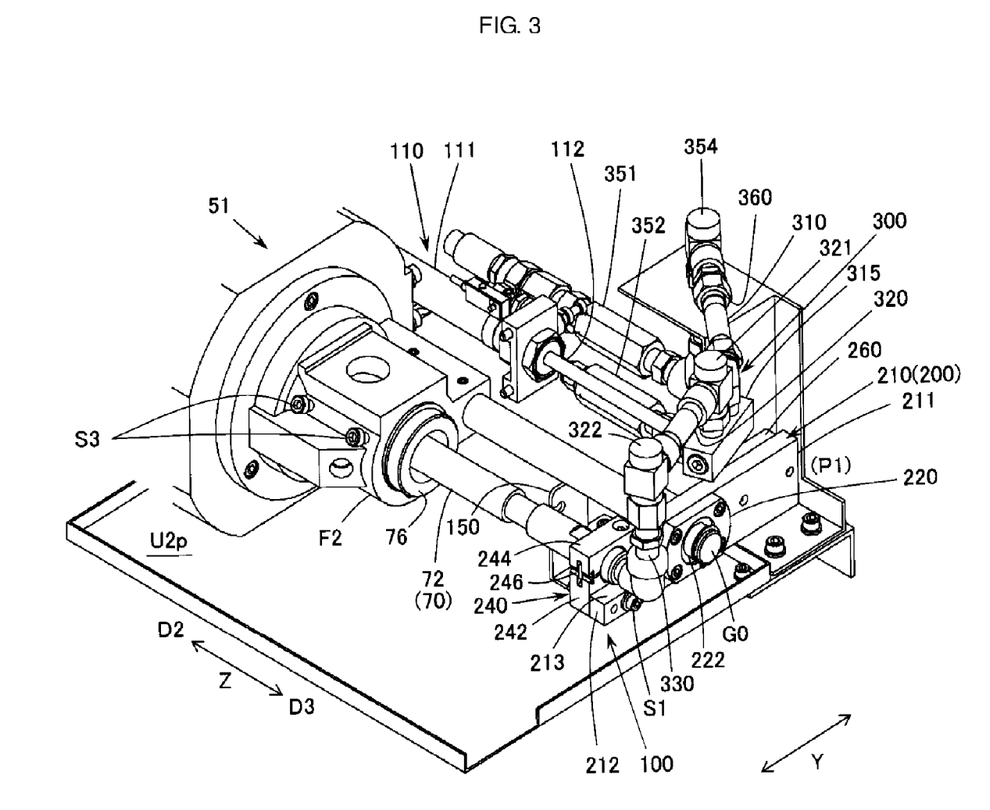
FIG. 3 is a perspective view of a rear part of the backworking unit where a coupler is in a coupling position.
Figure 4:
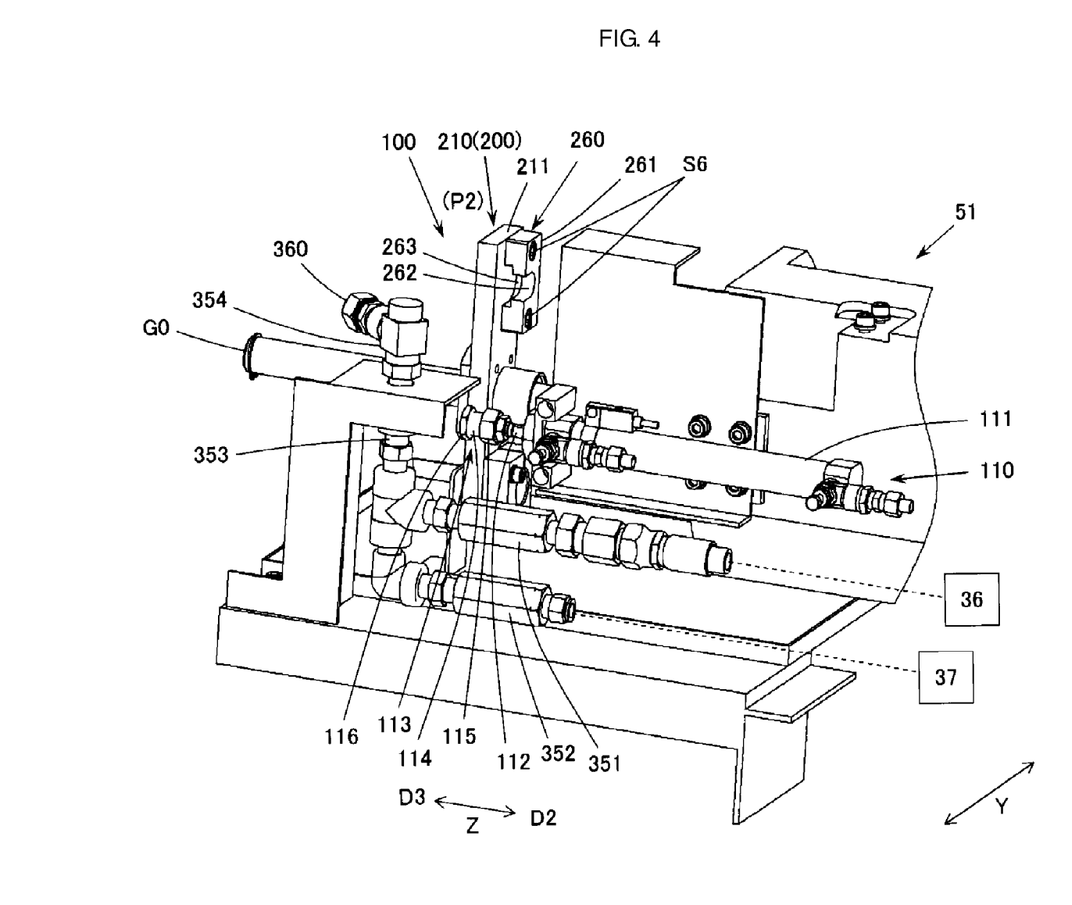
FIG. 4 is a perspective view of the rear part of the backworking unit where the coupler is in a standby position as seen from another angle different from FIG. 3.

FIG. 2 is a longitudinal section view along the spindle axis of the backworking unit provided with the sub spindle as an example of a spindle of an embodiment of the invention. FIG. 3 is a perspective view of the rear part of the backworking unit where the coupler is in the coupling position. Most part of the rod 112 is advanced from a cylinder 111 of the actuator 110. FIG. 3 shows the rear part of the backworking unit where the rod 112 is mostly retracted. FIG. 4 is a perspective view of the rear part of the backworking unit where the coupler is in the standby position as seen from another angle different from FIG. 3. Most part of the rod 112 is retracted in the cylinder 111. FIG. 4 shows the rear part of the backworking unit where the rod 112 is mostly advanced. The backworking unit 51 as shown in FIG. 2 to FIG. 4 comprises a rotating unit U1 provided with the sub spindle 52 having a chucking unit 60, a supporting unit U2 which rotatably supports the sub spindle 52, and a product ejecting apparatus 100 having a product ejector 70, the actuator 110, and the coupler 200. The product ejecting apparatus 100 is mostly arranged on a supporting plate U2p unmovably attached to the supporting unit U2. The product ejecting apparatus 100 may be a cylinder type. The product ejector 70 may be replaced by, for example, a product passage pipe 400.

The sub spindle 52 has a through-hole along the spindle axis AX1. The sub spindle 52 is rotatably attached to a body 21 of the supporting unit U2 via a bearing B1. The sub spindle 52 is provided with a chuck sleeve 63 and a push sleeve 65 inserted in the Z-axis direction (the direction of the spindle axis). The chuck sleeve 63 and the push sleeve 65 each has a through-hole along the spindle axis AX1 through which the product ejector 70 is inserted in the Z-axis direction. The sub spindle 52 along with the chuck sleeve 63 and the push sleeve 65 is rotated on the spindle axis AX1 around the product ejector 70. A built-in motor 55 is mounted around the sub spindle 52, comprising a stator 56 on the side of the supporting unit body 21 and a rotor 57 on the side of the sub spindle 52. The sub spindle 52 is driven by the motor 55 under control of the NC apparatus 80.

The chucking unit 60 comprises a collet 61, a cap 62, and a collet open/close mechanism 63 to 69. The chucking unit 60 chucks the workpiece W1 inserted in the sub spindle 52 and releases it after the back face of the workpiece W1 is machined. The collet 61 is attached to the front end of the sub spindle 52 to releasably chuck the workpiece W1 supplied from the headstock 41. The collet 61 is rotated along with the sub spindle 52. The collet 61 is provided with a taper part 61a made gradually thinner toward the rear. The taper part 61a has a slit at a plurality of spots (three spots, for example). The cap 62 is attached to the front end of the sub spindle 52 to hold the collet 61.

The collet open/close mechanism comprises the chuck sleeve 63, a coil spring 64 for opening the collet, the push sleeve 65, a claw 66, a shifter 67, a shifter lever 68, and an actuator 69 for opening/closing the collet. The chuck sleeve 63 is in contact with the taper part 61a of the collet 61 and slidabe in the Z-axis direction. The spring 64 is suspended on the collet 61 at the side of an advancing direction D2 thereof while on the inner circumferential surface of the chuck sleeve 63 at the side of a retracting direction D3 thereof. The spring 64 thereby urges the chuck sleeve 63 toward the retracting direction D3. The advancing direction D2 is a direction in which the workpiece W1 is pushed out toward the front side of the sub spindle 52 along the Z-axis direction. The retracting direction D3 is opposite the advancing direction D2. The push sleeve 65 is in contact with the rear end of the chuck sleeve 63 and slidabe in the Z-axis direction. The claw 66 has a distal end 66a, a base 66b, and a shaft 66c. The distal end 66a is in contact with a taper part 67a of the shifter 67. The base 66b is in contact with the rear end of the push sleeve 65. The claw 66 is tilted around the shaft 66c. The claw 66 is rotated along with the sub spindle 52. The taper part 67a of the shifter 67 is made gradually thinner toward the rear. The shifter 67 is slidable in the Z-axis direction. The shifter 67 is driven by the shifter lever 68. The shifter lever 68 is driven by the actuator 69 under control of the NC apparatus 80.

When the shifter 67 slides in the retracting direction D3 via the shifter lever 68 by the actuator 69, the claw 66 is rotated so that the distal end 66a thereof is moved away from the spindle axis AX1. The chuck sleeve 63 then slides in the advancing direction D2 via the push sleeve 65 by the base 66b of the claw 66. The collet 61 is then closed to chuck the workpiece W1. When the shifter 67 slides in the advancing direction D2 via the shifter lever 68 by the actuator 69, the chuck sleeve 63 and the push sleeve 65 are retracted by urging force of the spring 64. Accordingly the claw 66 is rotated so that the distal end 66a thereof is moved toward the spindle axis AX1. The collet 61 is then opened to release the back-machined workpiece W1.

The product ejector 70 is inserted inside the chuck sleeve 63 and the push sleeve 65. The ejector 70 comprises a cylindrical outer pipe 76 having a through-hole 76c extended in the Z-axis direction and the product ejecting shaft 72 having an ejection pin 74 at the front end thereof. The outer periphery of the outer pipe 76 is held by a stop ring 76s in contact with the rear end of a flange F2 mounted on the supporting unit U2. The product ejecting shaft 72 is provided with a through-hole 72c extended in the Z-axis direction. The ejecting shaft 72 is supported by the inner circumferential surface of the outer pipe 76 via a sliding bearing 75 called a metal bush and inserted through the through-hole 76c to be movable in the Z-axis direction. The through-hole 72c is for fluid such as blow oil and blow air. The outer rear-end periphery of the ejecting shaft 72 is held by a stop ring 73 not to allow a shaft holder 240 of the coupler 200 to be moved in the advancing direction D2. The front-machined workpiece W1 is inserted in the opened collet 61 and chucked thereby. The collet 61 is opened after the back face of the workpiece W1 is machined. The product (workpiece W1) is ejected toward the advancing direction D2 when the ejecting shaft 72 having the ejection pin 74 is advanced.

A fluid pipe 300 attached to the rear end of the ejecting shaft 72 is removably attached to a connection port 360 provided on a swivel joint 354. The swivel joint 354 is rotatable along the horizontal surface perpendicular to the X-axis direction. The fluid pipe 300 attached to the connection port 360 is connected to an oil supply unit 36 and a pressure air supply unit 37 via pipes 351 to 353 to selectively supply blow oil and blow air. As shown in FIG. 2 and FIG. 4, the common pipe 353 connected to the swivel joint 354 is connected to the oil pipe 351 from the oil supply unit 36 and the air pipe 352 from the pressure air supply unit 37 via a check valve. The fluid pipe 300 is removably attached to the connection port 360. Blow oil from the oil supply unit 36 is supplied to the collet 61 via the pipe 351, the pipe 353, the swivel joint 354, the fluid pipe 300, and the through-hole 72c of the ejecting shaft 72. Cut chips are thereby removed. Blow air from the pressure air supply unit 37 is supplied to the collet 61 via the pipe 352, the pipe 353, the swivel joint 354, the fluid pipe 300, and the through-hole 72c of the ejecting shaft 72. Cut chips are thereby removed.

As shown in FIG. 3 and FIG. 4, the product ejecting apparatus 100 comprises the actuator 110, the guide shaft G0, a standby position holder 150, the coupler 200, and the fluid pipe 300 in addition to the product ejector 70.

Figure 6:
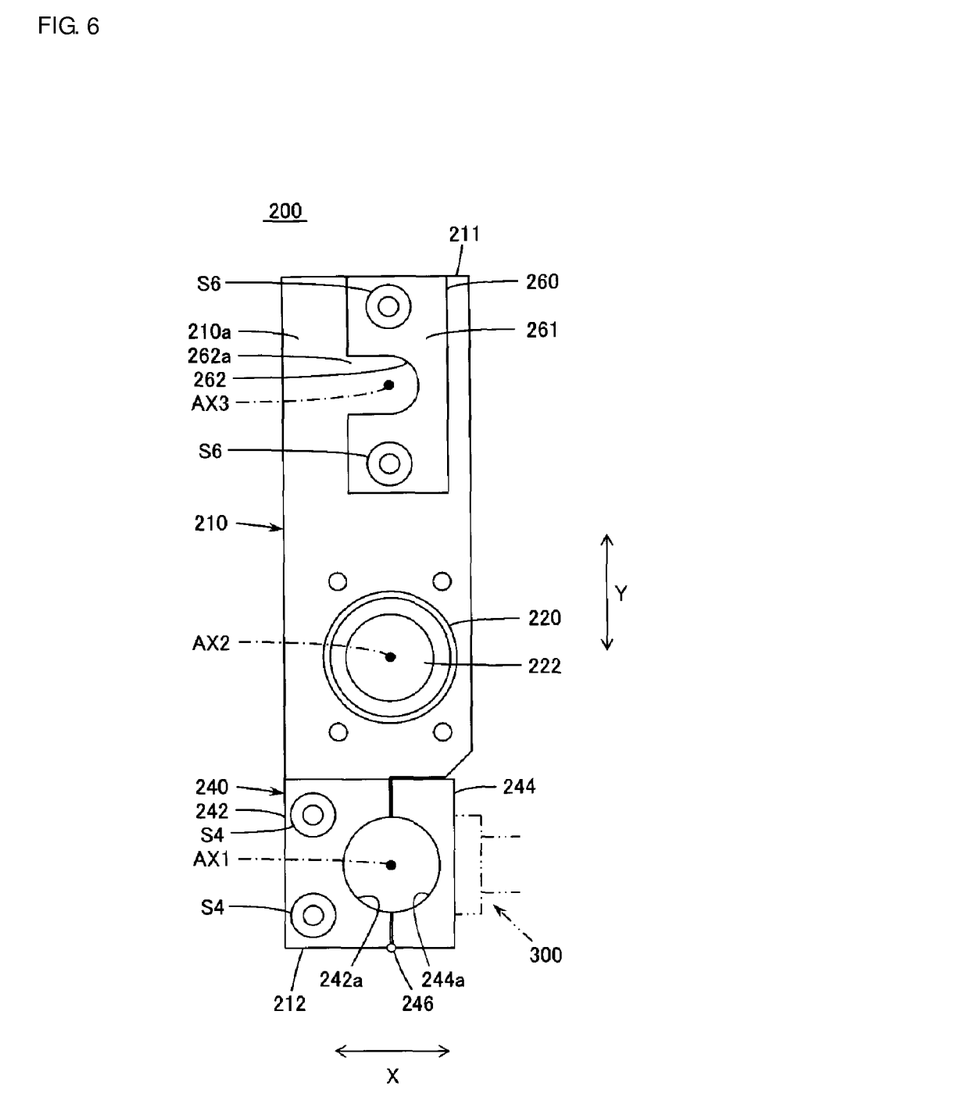
FIG. 6 shows an advancing side surface of the coupler.

FIG. 5 shows a positional relationship of the ejecting shaft 72, the rod 112, and the guide shaft G0 when the ejection shaft 72 and the rod 112 are connected by the coupler 200. The fluid pipe 300 is simplified in the drawing. FIG. 6 shows the advancing side surface of the coupler 200 and the relative positions of the spindle axis AX1, the guide shaft axis AX2, and the rod axis AX3. The rod 112 and the guide shaft G0 are parallel to the spindle axis AX1. The rod 112, the coupler 200, and the ejecting shaft 72 are smoothly reciprocated in the advancing direction D2 and the retracting direction D3 with respect to the stationary guide shaft G0.

The actuator 110 as shown in FIG. 3 to FIG. 5 is a linear motion actuator to allow reciprocation of the rod 112 in the Z-axis direction. The rod 112 is protruded from the cylinder 111 in the retracting direction D3. The rod 112 is almost circular in cross sectional shape. The cylinder 111 may be an air cylinder and the actuator 110 may be a servo motor. As shown in FIG. 4 and FIG. 5, the rod 112 has the engagement structure 113 at the rear end thereof. The engagement structure includes the thinner insert 114 and thicker stoppers 115 and 116 on both sides of the insert 114. The insert 114 is received in the groove 262 of the engaging piece 260 (an example of the engaging portion) of the coupler 200 when the coupler 200 is rotated from the standby position P2 to the coupling position P1. The stopper 115 on the advancing side is in contact with an advancing end 261 of the engaging piece 260 to restrict the movement of the coupler 200 with respect to the rod 112 in the advancing direction D2 when the coupler 200 is held in the coupling position P1. The stopper 116 on the retracting side is received in a deep grove 263 of the engaging piece 260 to restrict the movement of the coupler 200 with respect to the rod 112 in the retracting direction D3 when the coupler 200 is held in the coupling position P1.

The guide shaft G0 as shown in FIG. 3 to FIG. 5 is almost circular in cross sectional shape. The guide shaft G0 is parallel to the ejecting shaft 72 and the rod 112 and unmovably attached to the flange F2 between the ejecting shaft 72 and the rod 112. The guide shaft G0 goes through the through-hole 222 of a rolling bearing 220 of the coupler 200 to facilitate reciprocation of the coupler 200 in the advancing direction D2 and the retracting direction D3. In the embodiment, the spindle axis AX1, the guide shaft axis AX2, and the rod axis AX3 are parallel to each other. As shown in FIG. 6, the spindle axis AX1, the guide shaft axis AX2, and the rod axis AX3 are arranged in a straight line along the Y-axis direction. Torsion force applied to the rod 112 and the ejecting shaft 72 is thereby reduced, facilitating reciprocation of the rod 112 and movement of the ejecting shaft 72 in the Z-axis direction.

In FIG. 5, L1 is the distance between the spindle axis AX1 and the guide shaft axis AX2. L2 is the distance between the guide shaft axis AX2 and the rod axis AX3. L3 is the distance between the spindle axis AX1 and the rod axis AX3. The guide shaft G0 is arranged between the ejecting shaft 72 and the rod 112. There is a L1<L3 and L2<L3 relationship. The rod 112 is extended in the Z-axis direction. The coupler 200 is extended in the Y-axis direction. The ejecting shaft 72 is extended in the Z-axis direction. When driving force in the Z-axis direction is conveyed from the rod 112 to the ejecting shaft 72 via the coupler 200, torsion force (especially in the Y-axis direction) is likely applied to the rod 112 and the ejecting shaft 72. Due to the L1<L3 and L2<L3 relationship, torsion force applied to the rod 112 and the ejecting shaft 72 is reduced, thereby facilitating reciprocation of the rod 112 and movement of the ejecting shaft 72 in the Z-axis direction.

In FIG. 5, there is a L1<L2 relationship. The guide shaft G0 is nearer to the ejection shaft 72. The ejection shaft 72 moving in the Z-axis direction receives resistance from the sliding bearing 75 on the inner circumferential surface of the outer pipe 76. Due to the L1<L2 relationship, torsion force applied to the ejecting shaft 72 is further reduced, thereby further facilitating movement of the ejecting shaft 72 in the Z-axis direction.

The standby position holder 150 is a metal fitting fixed to the upper surface of the supporting plate U2p by a screw S2. The standby position holder 150 is provided with a recess 152 with which a screw S1 near a driven side end 212 of the coupler 200 is engaged when the coupler 200 is moved from the coupling position P1 in FIGS. 3 and 9 to the standby portion P2 in FIGS. 4 and 10.

The coupler 200 having a plate body 210 is rotatable on the guide shaft G0 to be switched between the coupling position P1 and the standby portion P2. The coupler 200 held in the coupling position P1 connects the rod 112 and the rear end of the ejecting shaft 72 inserted in the sub spindle 52. Driving force in the advancing direction D2 and the retracting direction D3 is thereby transmitted from the rod 112 to the ejection shaft 72. The coupler 200 held in the standby position P2 is separated from the rod 112 and the ejection shaft 72. The coupler 200 is still on the supporting plate U2p even when the product ejector 70 is not used. There is no need of removing the coupler 200 for storage. There is also no need of removing the cylinder 111 for storage.

As shown in FIG. 3, the coupler 200 is longitudinally arranged in the Y-axis direction when held in the coupling position P1. Both ends of the coupler 200 include a driving side end 211 on the side of the rod 112 and the driven side end 212 on the side of the ejecting shaft 72. The plate body 210 of the coupler 200 is provided with a through-hole 214 in the position across the guide shaft G0 with which the rolling bearing 220 is engaged. The plate body 210 is further provided with a recess 213 above the driven side end 212. The recess 213 receives the fluid pipe 300 connected to the rear end of the ejecting shaft 72. As shown in FIGS. 5 and 6, the shaft holder 240 is mounted on the advancing side surface 210a of the plate body 210 at the driven side end 212 while the engaging piece 260 is mounted on the advancing side surface 210a of the plate body 210 at the driving side end 211. As shown in FIGS. 3 and 8 to 10, the screw S1 is fitted on the retracting side surface of the plate body 210 at the driven side end 212 of the coupler 200.

The rolling bearing 220 fixed on the plate body 210 is a ball bush provided with the through-hole 222 for the guide shaft G0. The through-hole 222 is almost circular in cross sectional shape. The balling bearing 220 is a roll bearing using a ball allowing both linear motion and rotational motion. The plate body 210 on which the rolling bearing 220 is fixed is movable along the guide shaft G0 in the Z-axis direction and also rotatable thereon. The coupler 200 is therefore rotatable on the guide shaft G0 to be switched between the coupling position P1 and the standby position P2.

As shown in FIG. 6, the shaft holder 240 is fixed on the advancing side surface 210a of the plate body 210 at the driven side end 212 by screws S4. The shaft holder 240 has a mounting portion 242 fixed to the plate body 210 by the screws S4 and an open/close portion 244 rotatably mounted on the mounting portion 242 around a hinge 246 provided at the driven side end 212. The mounting portion 242 has a recess 242a to fit the outer periphery of the rear end of the ejecting shaft 72. The open/close portion 244 has a recess 244a to fit the outer periphery of the rear end of the ejecting shaft 72. The open/close portion 244 is fastened to the mounting portion 242 by a screw S5 (FIG. 5) with the rear end of the ejecting shaft 72 sandwiched therebetween.

The engaging piece 260 is fixed on the advancing side surface 210a of the plate body 210 by screws S6 at the driving side end 211 as shown in FIG. 6. The engaging piece 260 is provided with the U-shape groove 262 having an opening 262a for receiving the insert 114 of the rod 112 without using a screw or a fitting tool when the coupler 200 is rotated from the standby portion P2 to the coupled portion P1. The opening 262a of the groove 262 is horizontally oriented (in the Y-axis direction) when the coupler 200 is in the standby position P2 in FIG. 4 while oriented downwards (in the X-axis direction) when in the coupling position P1 in FIG. 3. As shown in FIGS. 4 and 5, the engaging piece 260 has the deep groove 263 on the retracting side of the groove 262 for receiving the stopper 116 on the retracting side of the rod 112. When the coupler 200 is held in the coupling position P1, the stopper 115 on the advancing side of the rod 112 is in contact with the advancing end 261 of the engaging piece 260. The engagement structure 113 of the rod 112 having the insert 114 and the stoppers 115 and 116 is brought into contact with the engaging piece 260 without using a screw or a fitting tool by moving the coupler 200 from the standby position P2 to the coupling position P1. Main components such as the sub spindle 52, the rod 112, the guide shaft G0, and the coupler 200 may be made of metal.

The fluid pipe 300 for blow oil and blow air comprises pipes 310, 320, and 330 and joints 315, 321, and 322. One end of the straight pipe 310 is removably connected to the connection port 360. The other end of the pipe 310 is connected to an elbow (a pipe joint of smaller radius of curvature) of the joint 315. The other end of the joint 315 is connected to the swivel joint 321. The other end of the swivel joint 321 is connected to one end of the straight pipe 320. The other end of the pipe 320 is connected to one end of the swivel point 322. The other end of the swivel joint 322 is connected to one end of the pipe 330 having an elbow. The elbow of the pipe 330 is connected to the rear end of the ejecting shaft 72. The swivel joints 321 and 322 are rotatable along with the swivel joint 354 on the horizontal surface perpendicular to the X-axis direction. The three swivel joints 354, 321, and 322 are arranged between the common pipe 353 and the ejecting shaft 72. This arrangement only requires limited space for movement of the fluid pipe 300 following reciprocation of the ejecting shaft 72. The embodiment reduces the machine tool in size.

The product ejector 70 can be replaced by the product passage pipe 400 as an alternative product ejecting apparatus mounted on the backworking unit 51.

Figure 7:
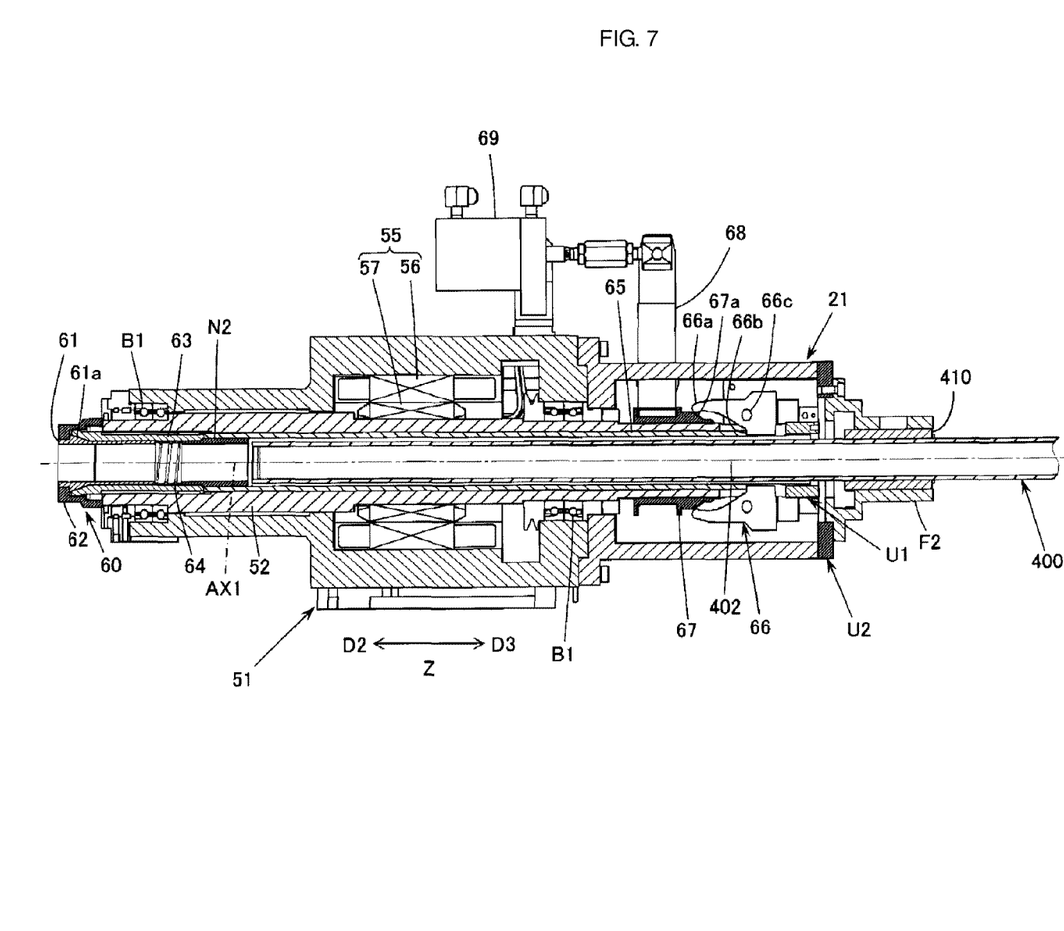
FIG. 7 is a longitudinal section view of the backworking unit having a product passage pipe.

FIG. 7 shows a longitudinal section view of the backworking unit on which the product passage pipe is mounted. The product passage pipe 400 is fastened to the flange F2 via a slit pipe 410. The product passage pipe 400 is provided with a through-hole 402 through which the back-machined product (the workpiece W1) passes in the Z-axis direction to be ejected from the not-shown rear end thereof. The slit pipe 410 having a plurality of slits is outside the product passage pipe 400 around the spindle axis AX1. The slit pipe 410 is tightened by screws S3 (FIG. 3) of the flange F2 to fasten the product passage pipe 400. The product ejecting apparatus in FIG. 7 is a pipe type ejecting apparatus.

(3) Operation of the Machine Tool of the Embodiment

Moving the ejecting shaft 72 in the Z-axis direction is being described. The coupler 200 is held in the coupling position P1 as shown in FIG. 3. The shaft holder 240 is in engagement with the rear end of the ejecting shaft 72 while in contact with the retracting side surface of the stop ring 73 as shown in FIG. 5. The engaging piece 260 is in engagement with the rear end of the rod 112 while in contact with the retracting side surface of the stopper 115.

When the rod 112 is retracted by the actuator 110 under control of the NC apparatus 80, the coupler 200 is retracted along the guide shaft G0 and the product ejecting shaft 72 along with the coupler 200 is moved in the retracting direction D3. As shown in FIG. 5, there is the L1<L2<L3 relationship. Torsion force applied to the rod 112 and the ejecting shaft 72 is reduced, facilitating their movement in the retracting direction D3.

When the rod 112 is advanced by the actuator 110 under control of the NC apparatus 80, the coupler 200 is advanced along the guide shaft G0 and the product ejecting shaft 72 along with the coupler 200 is moved in the advancing direction D2. As shown in FIG. 5, there is the L1<L2<L3 relationship. Torsion force applied to the rod 112 and the ejecting shaft 72 is reduced, facilitating their movement in the advancing direction D2.

Figure 8:
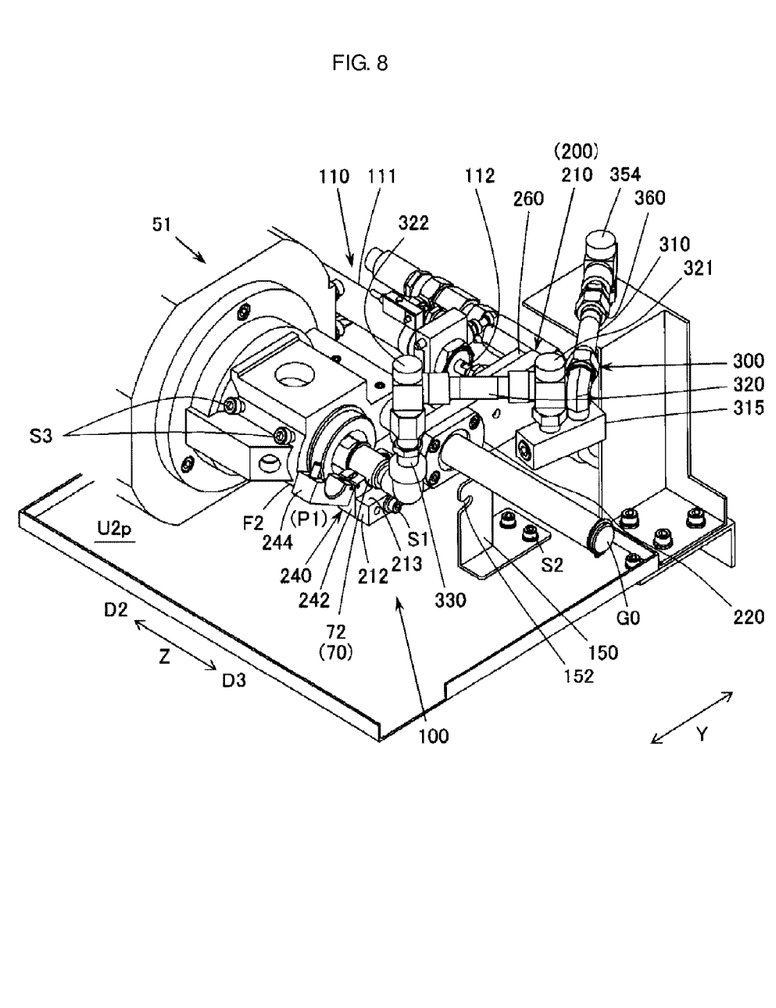
FIG. 8 is a perspective view of the rear part of the backworking unit where the product ejecting shaft is released from the coupler.
Figure 9:
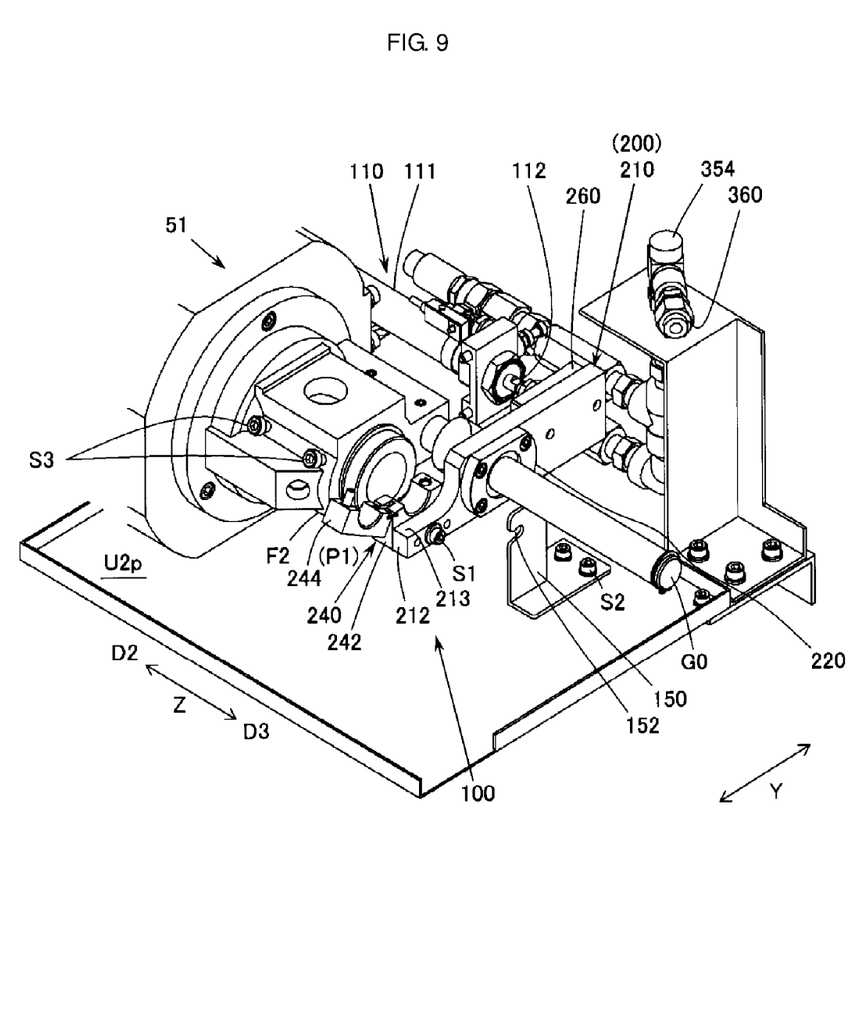
FIG. 9 is a perspective view of the rear part of the backworking unit where the product ejecting shaft is removed from the backworking unit.

Switching the product ejector 70 (FIG. 3) to the product passage pipe 400 (FIG. 7) is being described. First, the rod 112 is advanced by the actuator 110 and the ejecting shaft 72 along with the coupler 200 is advanced. Then, the screw S5 (FIG. 5) is removed from the mounting portion 244 of the shaft holder 240 and the open/close portion 244 is opened as shown in FIG. 8. Engagement of the shaft holder 240 with the ejecting shaft 72 is thereby released. Then, the rear end of the ejecting shaft 72 is manually pushed into the sub spindle 52 and the ejection pin 74 is removed from the front end of the ejecting shaft 72. Then, the nut on the connection port 360 is loosened to remove the fluid pipe 300 therefrom. The ejecting shaft 72 connected to the fluid pipe 300 is pulled out from the outer pipe 76 toward the retracting direction D3. FIG. 9 shows that the ejecting shaft 72 and the fluid pipe 300 are removed from the backworking unit 51.

Figure 10:
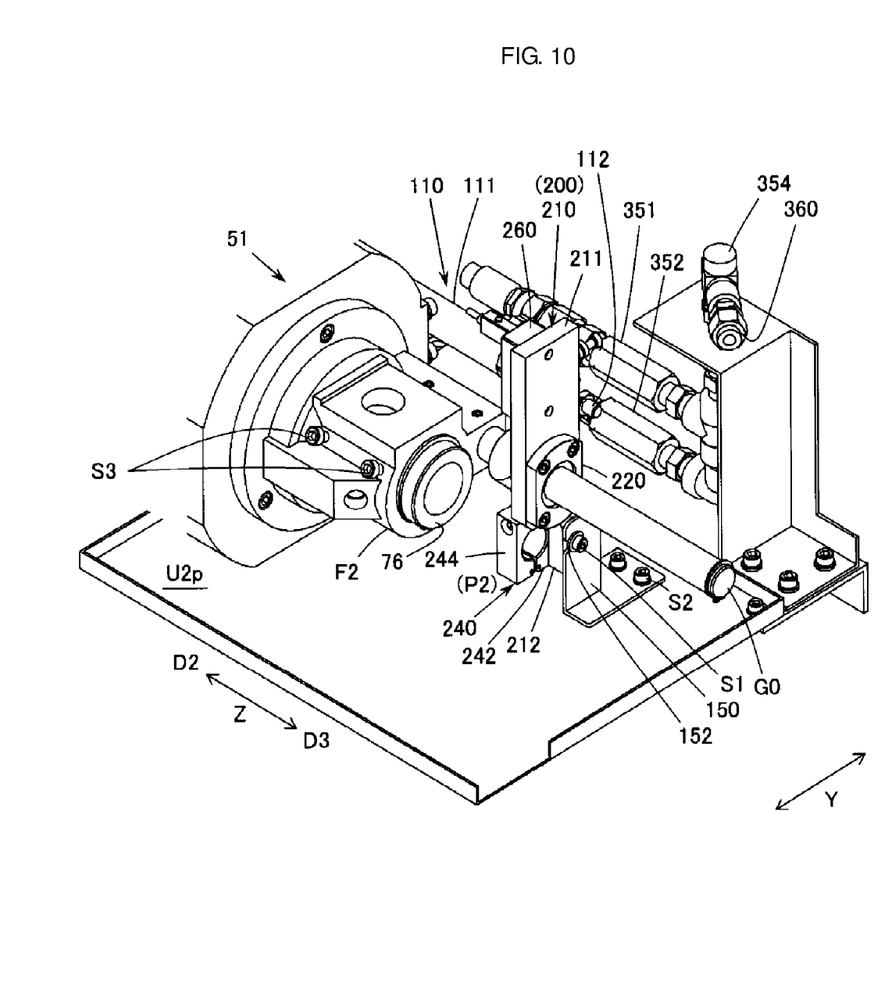
FIG. 10 is a perspective view of the rear part of the backworking unit where the coupler is held in the standby position.

The open/close portion 244 of the shaft holder 240 is closed and fastened by the screw S5. The rod 112 and the engaging piece 260 are engaged without a screw. The coupler 200 is rotated by 90 degrees from the coupling position P1 to the standby position P2 around the guide shaft G0. As shown in FIGS. 4 and 10, the insert 114 and the stopper 116 of the rod 112 are disengaged from the groove 262 and the deep groove 263 of the engaging piece 260, and the screw S1 of the coupler 200 is received in the recess 152 of the standby position holder 150. The screw S1 is fastened to unmovably hold the coupler 200 in the standby position P2. Then, the two screws S3 on the flange F2 are loosened to pull the outer pipe 76 out the sub spindle 52 toward the retracting direction D3.

Then, the slit pipe 410 (FIG. 7) is inserted into the flange F2, the product passage pipe 400 is inserted into the sub spindle 52, and the two screws S3 are fastened to the flange F2. Assembling the product ejecting apparatus in FIG. 7 is completed.

Switching the product passage pipe 400 (FIG. 7) to the product ejector 72 (FIG. 3) is being described. First, the two screws S3 on the flange F2 are loosened and the product passage pipe 400 is pulled out the sub spindle 52 toward the retracting direction D3. The slit pipe 410 is pulled out the flange F2 toward the retracting direction D3.

The outer pipe 76 is inserted into the sub spindle 52 and the two screws S3 are tightened as shown in FIG. 10. The screw S1 is loosened to release the coupler 200. The rod 112 and the engaging piece 260 are engaged without a screw. The coupler 200 is rotated by 90 degrees from the standby position P2 to the coupling position P1 around the guide shaft G0. The screw S1 of the coupler 200 is released from the recess 152 of the standby position holder 150, and then the insert 114 and the stopper 116 of the rod 112 are respectively received in the groove 262 and the deep groove 263 of the engaging piece 260. The engaging piece 260 is held by the stoppers 115 and 116 arranged on the Z-axis direction sides of the insert 114. The engaging piece 260 and the rod 112 are thereby engaged without a screw or a fitting tool not to relatively move in the reciprocating direction of the rod 112. The screw S5 (FIG. 5) is removed from the mounting portion 242 of the shaft holder 240 to open the open/close portion 244 as shown in FIG. 9.

The ejecting shaft 72 connected to the fluid pipe 300 is inserted into the outer pipe 76. The fluid pipe 300 is connected to the connection port 360. The ejection pin 74 is attached to the front end of the ejection shaft 72 as shown in FIG. 8. The open/close portion 244 of the shaft holder 240 is closed on the retracting side of the stop ring 73 of the ejection shaft 72. The screw S5 (FIG. 5) is fastened. The ejection shaft 72 is engaged with the shaft holder 240 and the rod 112 is coupled with the ejection shaft 72 by the coupler 200.

The rod 112 is advanced by the actuator 110 under control of the NC apparatus 80. The coupler 200 is moved in the Z-axis direction along the guide shaft G0, and the ejection shaft 72 along with the coupler 200 is moved in the Z-axis direction.

As described above, when the actuator 110 is used, the coupler 200 is held in the coupling position P1 to connect the ejection shaft 72 and the rod 112 so that the ejection shaft 72 is moved in the Z-axis direction by the actuator 110. When the actuator 110 is not used, the coupler 200 is held in the standby position P2 where the coupler 200 is not connected to the ejection shaft 72 and the rod. The product passage pipe 400 or another product ejecting apparatus can be used without removing the coupler 200 and the cylinder 111 for storage. The coupler 200 is movable from the standby position P2 to the coupling position P1 to be connected to the rod 112 without using a screw or a fitting tool. The embodiment facilitates a process of switching product ejecting apparatuses.

(4) Modified Embodiments

The invention may be embodied in various ways. For example, the product ejecting apparatus may be removabley mounted on the headstock. The axes AX1, AX2, and AX3 may be preferably arranged in a straight line, but not limited thereto. They may be arranged in a not-straight line. For example, the guide shaft axis AX2 may be shifted in the X-axis direction. The coupler 200 maybe rotatable around the rod 112, not the guide shaft G0, to be switched between the coupling position and the standby position where the coupler 200 along with the rod 112 may be away from the ejecting shaft 72. Further, movement of the coupler may be not limited to rotation, but parallel movement or another may be available.

The invention provides a machine tool capable of facilitating the process of switching product ejecting apparatuses in various embodiments. A fundamental effect as above described is also available from any technology only consisting of the elements of the independent claim. The invention covers any mutually replaced or modified configuration in the embodiments or prior art.

What is claimed is:

1. A machine tool comprising:
    a spindle which rotates a workpiece around an axis of the spindle;
    an actuator which reciprocates a rod arranged parallel to the axis of the spindle;
    a coupler switched between a coupling position and a standby position, the coupler connecting the rod and an ejecting shaft inserted in the spindle when held in the coupling position, and the coupler not being connected to at least the ejecting shaft when held in the standby position; and
    a guide shaft arranged parallel to the axis of the spindle and the rod,
    wherein the ejecting shaft along with the coupler is moved in a direction parallel to the axis of the spindle according to reciprocation of the rod when the coupler is held in the coupling position,
    wherein the coupler is provided with a through-hole through which the guide shaft passes, and
    wherein the coupler is moved along the guide shaft in the direction parallel to the axis of the spindle and rotated around the guide shaft to be switched between the coupling position and the standby position.

2. The machine tool of claim 1,
    wherein a distance between the axis of the spindle and an axis of the guide shaft is shorter than a distance between the axis of the spindle and an axis of the rod,
    wherein a distance between the axis of the guide shaft and the axis of the rod is shorter than the distance between the axis of the spindle and the axis of the rod.

3. The machine tool of claim 1, wherein the coupler is further provided with an engaging portion having a groove for receiving the rod when the coupler is switched from the standby position to the coupling position,
    wherein the rod is provided with an insert to be received in the groove, and
    wherein the rod is further provided with an engagement structure to be engaged with the engaging portion to prevent relative reciprocation of the rod when the insert is received in the groove.

4. The machine tool of claim 2, wherein the coupler is further provided with an engaging portion having a groove for receiving the rod when the coupler is switched from the standby position to the coupling position,
    wherein the rod is provided with an insert to be received in the groove, and
    wherein the rod is further provided with an engagement structure to be engaged with the engaging portion to prevent relative reciprocation of the rod when the insert is received in the groove.

5. A machine tool comprising:
    a spindle which rotates a workpiece around an axis of the spindle;
    an actuator which reciprocates a rod arranged parallel to the axis of the spindle;
    a coupler switched between a coupling position and a standby position, the coupler connecting the rod and an ejecting shaft inserted in the spindle when held in the coupling position, and the coupler not being connected to at least the ejecting shaft when held in the standby position; and
    a standby position holder arranged on the rear side of the spindle with respect to a direction substantially parallel to the axis of the spindle, the standby position holder having a recess for receiving a part of the coupler to fix the coupler held in the standby position;
    wherein the coupler is pivoted about a pivot axis parallel to the axis of the spindle from the coupling position to the standby position, the pivot axis is located between the axis of the spindle and the rod; and
    wherein the ejecting shaft along with the coupler is moved in the direction parallel to the axis of the spindle according to reciprocation of the rod when the coupler is held in the coupling position.

6. The machine tool of claim 5, further comprising a guide shaft arranged parallel to the axis of the spindle and the rod,
    wherein a distance between the axis of the spindle and an axis of the guide shaft is shorter than a distance between the axis of the spindle and an axis of the rod,
    wherein a distance between the axis of the guide shaft and the axis of the rod is shorter than the distance between the axis of the spindle and the axis of the rod,
    wherein the coupler is provided with a through-hole through which the guide shaft passes, and
    wherein the coupler is moved along the guide shaft in the direction substantially parallel to the axis of the spindle and rotated around the guide shaft to be switched between the coupling position and the standby position.

7. The machine tool of claim 5, wherein the coupler is further provided with an engaging portion having a groove for receiving the rod when the coupler is switched from the standby position to the coupling position,
    wherein the rod is provided with an insert to be received in the groove, and
    wherein the rod is further provided with an engagement structure to be engaged with the engaging portion to prevent relative reciprocation of the rod when the insert is received in the groove.

8. The machine tool of claim 6, wherein the coupler is further provided with an engaging portion having a groove for receiving the rod when the coupler is switched from the standby position to the coupling position,
    wherein the rod is provided with an insert to be received in the groove, and
    wherein the rod is further provided with an engagement structure to be engaged with the engaging portion to prevent relative reciprocation of the rod when the insert is received in the groove.

* * * * *